April 1, 1930.   E. W. ACKERMAN ET AL   1,752,409
HYDRAULIC REBOUND DEVICE
Filed Jan. 18, 1928   2 Sheets-Sheet 1
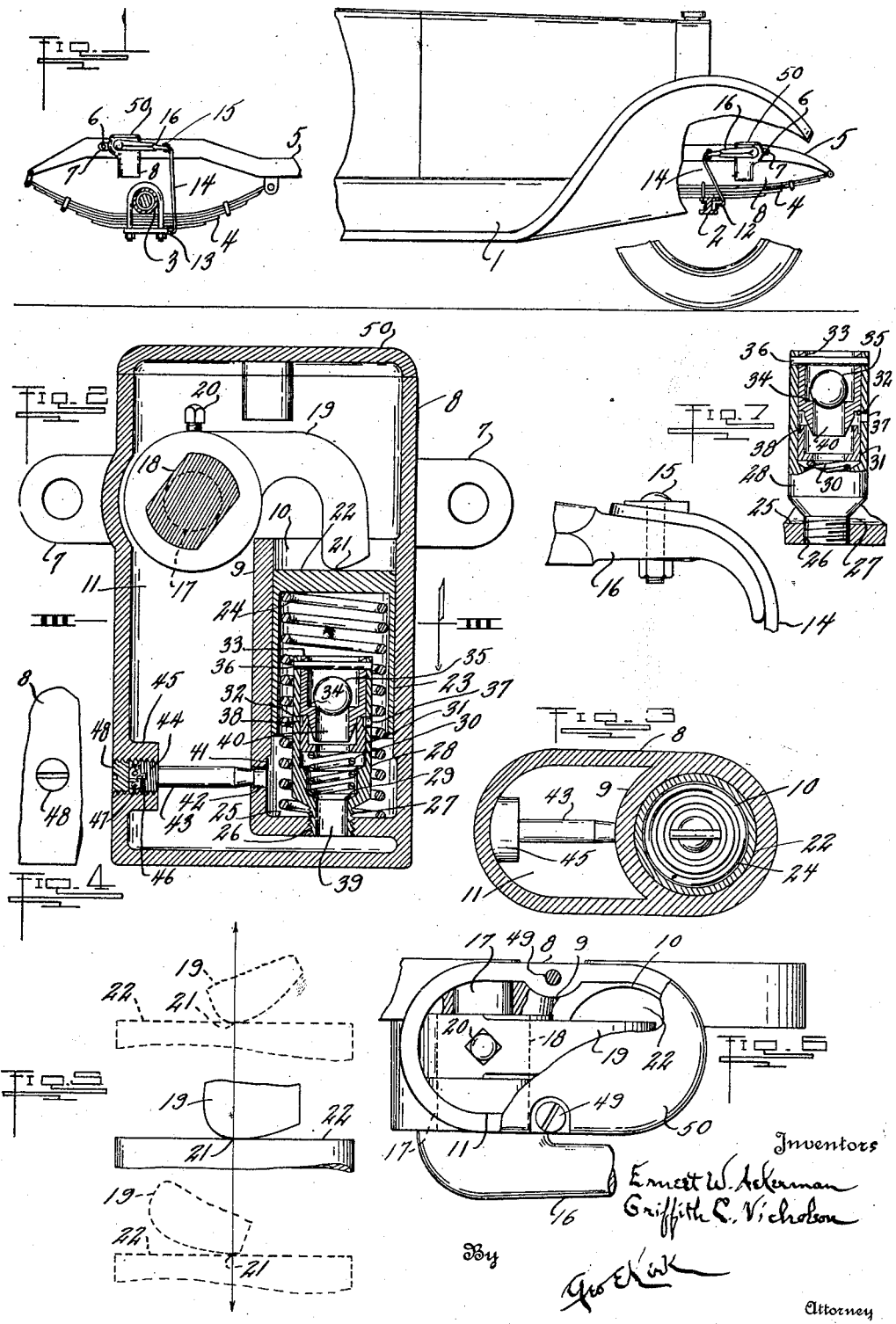

April 1, 1930.  E. W. ACKERMAN ET AL  1,752,409
HYDRAULIC REBOUND DEVICE
Filed Jan. 18, 1928   2 Sheets-Sheet 2
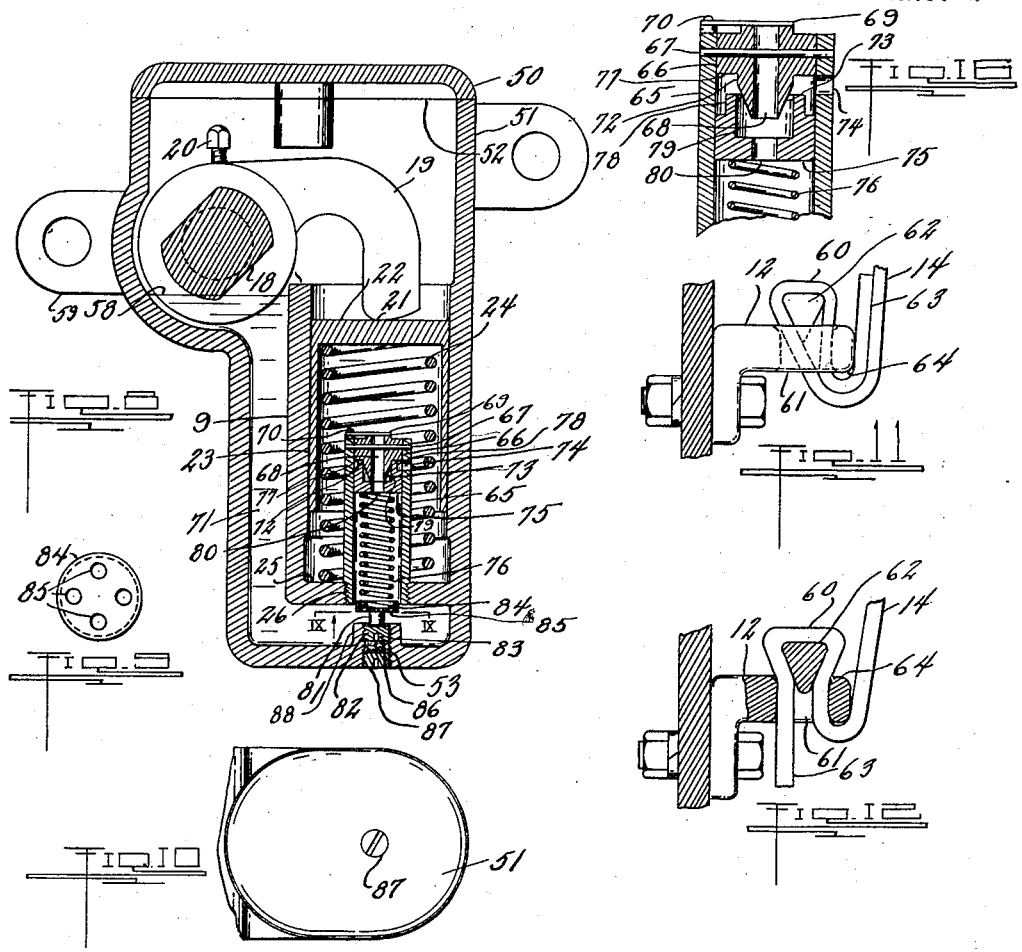
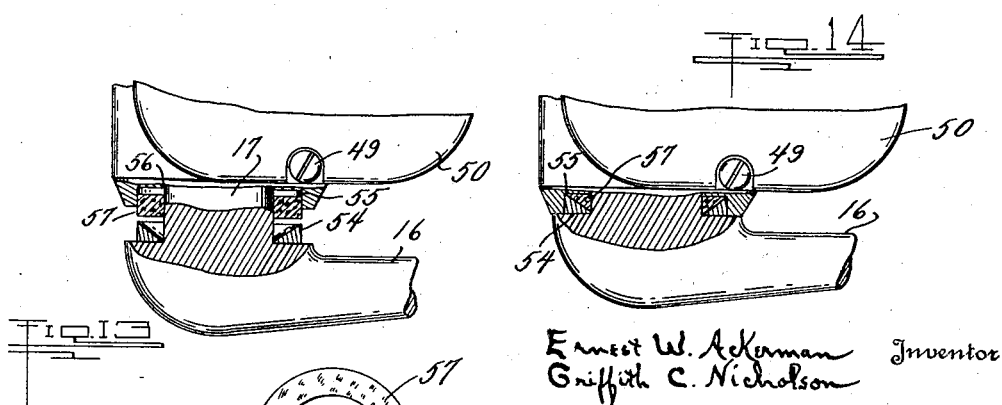
Ernest W. Ackerman
Griffith C. Nicholson   Inventors
By Geo E Kirk
Attorney Patented Apr. 1, 1930

1,752,409

UNITED STATES PATENT OFFICE

ERNEST W. ACKERMAN AND GRIFFITH C. NICHOLSON, OF MONROE, MICHIGAN, ASSIGNORS TO THE HYDRO-CHECK CORPORATION, OF MONROE, MICHIGAN, A CORPORATION OF MICHIGAN

HYDRAULIC REBOUND DEVICE

Application filed January 18, 1928. Serial No. 247,591.

This invention relates to rebound take up devices of the piston and cylinder type.

This invention has utility when incorporated in a rebound take up device for liquid or liquid and gas with relief valve therefor.

Referring to the drawings:

Fig. 1 is a fragmentary view of a motor vehicle having an embodiment of the invention incorporated therewith;

Fig. 2 is a vertical section on an enlarged scale of the device, portions being broken away;

Fig. 3 is a section on the line III—III, Fig. 2, looking in the direction of the arrow;

Fig. 4 is a fragmentary view in side elevation showing the seepage adjustment seal;

Fig. 5 is a partial diagrammatic showing of the maintained contact for balanced coaction of the cam with the piston for minimizing tilting action of the piston in operation;

Fig. 6 is a fragmentary plan view of the device of Fig. 2;

Fig. 7 is a detail view of the check and relief valve in the relief valve open position therefor;

Fig. 8 is a reduced weight embodiment of the invention herein having additional features of utility in construction and operation;

Fig. 9 is a bottom plan view of the shiftable cup for adjusting the relief spring of Fig. 8;

Fig. 10 is a bottom plan view of the housing of Fig. 8;

Fig. 11 is a detail view of the axle connection for the strap in the preferred form;

Fig. 12 is a view similar to Fig. 11, showing strap connection when the length of strap available is not sufficient for the assembly as shown in Fig. 11;

Fig. 13 is a fragmentary plan view of the device showing the rock shaft coming into assembly position for the packing before reaching the packing;

Fig. 14 is a view similar to Fig. 13 with the assembly completed and the packing deformed in such assembly;

Fig. 15 is a view in side elevation of the packing ring; and Fig. 16 is a detail view of the opened relief valve of Fig. 8.

Motor vehicle 1 is shown as provided with front axle 2 and rear axle 3. Springs 4 connect such axles to chassis or frame 5. Bolts 6 through lugs 7 mount housing 8 fast with the chassis 5. This housing 8 has therein partition 9 forming cylinder 10 open at its top for communication with outer chamber 11 in the casing. Connections 12, 13, for flexible straps or bands 14 are anchored by bolts 15 to the free ends of arms 16. These arms 16 have offset trunnions or shafts 17 extending into the housing 8 laterally of the cylinder 10 and there have key portion 18 on which is mounted arm 19 which is locked by set screw 20.

This arm 19 at its free portion has cam nose 21, disposed at the operative positions of the cam to contact approximately central position of piston 22 having depending skirt 23, herein shown as imperforate, to provide a chambered portion in which is disposed compression helical spring 24 extending to abut cylinder bottom wall 25 about threaded opening 26 in which is mounted tubular threaded stem 27 of intake valve having cylindrical portion 28 rising therefrom as a tower. This valve, upwardly from the threaded portion 27 has shoulder 29 for compression helical spring 30 to act on sleeve 31 to thrust such sleeve normally against shoulder 32 of secondary sleeve 33 providing seat 34 for intake permitting check valve ball 35.

Pin 36 holds this ball 35 against being thrown from the sleeve 33 and likewise anchors this sleeve 33 with the tower 28 so that the shoulder 32 is fixed. This tower 28, adjacent the lower side of the shoulder 32 is provided with port 37 while the sleeve 31 as a plunger has adjacent this shoulder 32 inwardly offset region 38 permitting liquid pressure, as generated in the cylinder 10 below the piston 22 to be transmitted through the port 37 and about this offset 38 in initially creating pressure on the sleeve 31 to overcome the action on the spring 30 thereby unseating this sleeve 31 with greater pressure area from the shoulder 32 in relief operation of this valve for permitting flow into the sleeve 31 and therefrom by port 39 through the stem 27 into the chamber 11 below the cylinder head 25.

Port 40 from ball seat 34, in upward thrusting travel of the piston 22 as actuated by the spring 24, transmits the pressure from the head of liquid in the chamber 11 for unseating the ball 34 and thereby permits liquid flow into this cylinder below the skirted piston by way of this tower valve.

The cylinder partition or wall 9, in enlargement region 41, clear of the skirt 23 of the piston 22 has port 42 in proximity to which is adjusted stem 43 providing seepage opening communication between the chamber 11 and the cylinder 10 below the piston 22.

The stem 43 is provided with enlarged threaded portion 44 as a mounting for this stem 43 in inwardly extending boss 45 of the housing 8. Screw driver seat 46 in this threaded portion 44 permits the adjustment of the stem 43 to vary its clearance as to the port 42 and thus regulates the rate of liquid transit, more especially from the cylinder in compressing action before the relief valve is open. Packing 47 is inserted over this screw driver seat 46, such packing being say graphited asbestos, over which there is disposed closure plug 48.

The housing may be filled with lubricant of say a combination of glycerine and wood alcohol, according to temperature conditions which it is desired to meet or even by a maintained fluid liquid for wide range of temperature. When this is so charged to a level either above or below the partition wall 9, bolts 49 may be effective for anchoring lid 50 in position for closing this device.

Housing 51 is shown as provided with the lid 50 with assembly bolts 49 for assembling such closure or lid 50 at top major opening 52 as opposing minor bottom opening 53 (Fig. 8). This housing 51 has cylinder 9 therein with piston 22 provided with skirt 23. Within the skirt 23 of this piston 22 is compression helical spring 24 normally urging this piston 22 against cam nose 21 of arm 19 fixed by set screw 20 on key portion 18 of rock shaft 17 from which extends rock arm 16.

This rock shaft 17, adjacent the arm 16 is provided with outwardly flaring washer 54 as a wedge or cone shiftable (Figs. 13, 14) into seat 55 of the housing about shaft opening 56 through said housing 51. In this seat 55 is disposed packing 57 herein shown as a cork gasket, or washer of rectangular cross section. Accordingly, in thrusting the shaft 17 into the housing 51, there to have set screw 20 anchor the shaft against working outward, there is deformation of the packing 57 by the flare washer 54 resulting in this packing 57 being changed from rectangular cross section to triangular cross section. Furthermore, this wedging action or deformation is more toward the shaft 17 than otherwise.

This results in an effective packing against leaking of the glycerine or oil 58 from the housing 51.

This housing 51 is provided with vertically offset or perforate lugs 59 so that in assembly by bolts 6 with motor vehicle chassis frame 5, there may be an approximation of vertical position for the cylinder 9 in the housing 51.

From the free end of the arm 16, the flexible strap 14 as extending to connections or brackets 12, 13, has in the preferred form, loop 60 (Fig. 11) upward through eye 61 and there to be engaged by wedge 62 with free end 63 of this strap 14 spacing the working position of the strap 14 from tower ring holding side 64 of the connection 12. There is thus provided by this free end 63 a cushion, promoting length of life for the strap 14 by reducing the wear action thereon. Furthermore, this is a locking of the free end against wedge loosening. The wedge is a simple means permitting full range of adjustment in strap length. In the event the strap 14, say of flat strip canvas or webbing be not of sufficient length or it be not convenient to effect the cushioning wrap for the free end, there may be the direct wrap over for the wedge as shown in Fig. 12.

The cylinder 9 is shown as provided with cylinder head 25 and central bottom port 26. This latter is the sole opening into the cylinder below the piston. This threaded opening or port 26 from the cylinder head 25 has mounted therein sleeve 65 upwardly extending to carry ported plug member 66, as anchored by pin 67 in this upper terminus of the valve 65 as extending into the region of the skirted piston 23. This plug member 66 has central port 68 normally closed by leaf spring 69 having anchor pin 70 with the sleeve 65. This leaf spring 69 is accordingly the intake relief or check valve permitting flow of liquid from the chamber 71 above the cylinder 9 through the opening at the bottom end of the sleeve 65 thence by port 68 and past the leaf 69 as flexed away from such port due to the reduction of pressure in the skirted piston 22, 23, as such piston is moved by the spring 24 away from the head 25 in following the rock arm 19 in its upward travel.

This plug 66 is provided with cylindrical extension 72 with tapered portion 73 therefrom. At the underside of this plug 66, opposite the cylindrical portion 72, the sleeve 65 is provided with port 74 for relief valve operation. Relief valve plunger 75 is normally actuated by helical compression spring 76 to thrust this plunger 75 against ledge 77 on the under side of the plug 66. This brings annular clearance region 78 of the plunger 75 into the vicinity of the port 74 and interior cylindrical portion 79 of this plunger about the cylindrical portion 72 of the plug. Accordingly, as pressure builds up within the cylinder 9, as affected by the piston 22 travel to compress the spring 24, such pressure is transmitted through the relief port 74 into the reduced diameter region 78 to overcome the resistance of the spring 76 and at the increased effective area on this plunger as leaving the ledge 77, there is movement of this plunger to clear the cylindrical region 72 and pass into the tapered region 73 for more free flowing of relief liquid from within the cylinder, through port 80 of this plunger 75, and thence clear of the sleeve 65 by way of the port 26 into the housing portion or chamber 71.

In this disclosure there is permitted communication between the cylinder 9 as below the piston 22 only through the port 26. Accordingly, the unit mounted in this port 26 is both intake for outlet check as well as outlet relief, and as herein shown, the spring 76 is adjustable to vary the relief response and thereby take into account a range of adjustment response for this relief valve to meet the range of desired conditions in practice. This adjustment of the spring 76 is effected by pin 81 having threaded portion 82 with screw seat 83 operable in minor internally threaded opening 53 of the housing 51. This pin 81 coacts with cup 84 having openings 85 therein for adequate flow capacity in and out of the sleeve 65. By rotating this pin 81, its threaded portion 82 will feed inwardly or outwardly and thus vary the compression of the spring 76 to permit the desired range of adjustment in relief valve operation. This threaded portion 82 is herein shown concealed by say asbestos graphite packing 86 covered by plug or cover 87 at the opening 85. There is thus concealed, at this internal boss 88, a flush adjustment for regulating the relief or seepage.

The range of operation or movement for the arm 16 is preferably one wherein the cam nose 21 range of upper position is not above the plane of the axis of the shaft 17 as parallel to the plane of the top of the piston 22. The range of operation is accordingly thus normally downward from this position. By locating this region of contact for the cam 21 central of the piston 22, the action of the spring 24 in thrusting the piston against this arm minimizes any tendency of the piston to tilt and thereby avoid varying its clearance as to its cylinder by extremes of wear. This means that there is not only maintained life, but maintained uniformity of operation throughout the life of the device.

In motor vehicle practice, the rebound concussions usually occur as a quick strain on the strap or flexible connection 14. This means that the arm 19 gives a quick depression action upon the piston 22 against the resistance of the spring 24. In practice with the device of this disclosure, air or gas which may be trapped in filling or due to other circumstances entrained within the skirted piston, is quickly exhausted therefrom by this abrupt action from the arm 16. On quick action from the arm there may be displaced the entire gas or air accumulation, thus forthwith converting this device from what might have been pneumatic and hydraulic resistance to the arm 16, to a hydraulic resistance modified only by the seepage adjustment at the port 42 and the relief valve.

What is claimed and it is desired to secure by Letters Patent is:

1. A rebound take up device comprising a housing, a cylinder upwardly open in said housing, a downwardly skirted piston in said cylinder, and a rock arm having a cam face configured for engaging approximately a common point on said piston at different distances of the piston from the shaft in approximating balanced positioning against tilting tendency of said piston in the cylinder.

2. A rebound take up device comprising a housing, a cylinder upwardly open in said housing, a downwardly skirted piston in said cylinder, a rock arm having a cam frace configured for engaging approximately a common point on said piston at different distances of the piston from the shaft in approximating balanced positioning against tilting tendency of said piston in the cylinder, and a spring normally urging the piston out of the cylinder against the action of said arm.

3. A rebound take up device comprising a housing, a cylinder upwardly open in said housing, a downwardly skirted piston in said cylinder, said cylinder having a port at its lower portion, and an intake check and relief valve unit fixedly anchored at said port to protrude upwardly into the skirted region of the piston.

4. A rebound take up device comprising a housing, a cylinder upwardly open in said housing, a downwardly skirted piston in said cylinder, said cylinder having a port at its lower portion, and a valve device fixed at and rising from said port and effective for exhausting trapped glass from said skirted piston.

5. Apparatus for removing trapped gases embodying a cylinder for a liquid, a downwardly skirted piston submersible in the liquid above the depending skirt thereof entrapping gas under the piston, means for effecting relative shifting between the piston and cylinder for generating a pressure in the gas greater than the normal pressure of the liquid and a pressure relief device in the cylinder providing a passage for bubbling the gas out downwardly from said piston.

6. A rebound take up device comprising a housing having a cylinder therein provided with a head, a piston in said cylinder movable toward and from said head, there being a port in said head, and a combined check and relief valve fixed in said head port isolating said cylinder interior between the piston and head from other communication with said housing interior than through said port.

7. A rebound take up device comprising a housing having a cylinder therein provided with a head spaced from the housing, a piston in said cylinder movable toward and from said head, there being a port in said head and a registering opening in the housing, a combined check and relief valve fixed in said head port, and adjusting means in said housing opening for the relief valve.

8. A rebound take up device comprising a housing having a cylinder therein provided with a head spaced from the housing, a piston in said cylinder movable toward and from said head, there being a port in said head and a registering opening in the housing, a relief valve fixedly mounted in said cylinder head port, and adjusting means in said housing opening for the relief valve.

In witness whereof we affix our signatures.

ERNEST W. ACKERMAN.
GRIFFITH C. NICHOLSON.